Sept. 22, 1959  H. GRONAU  2,905,063
SLOTTING MECHANISM
Filed July 2, 1957  6 Sheets-Sheet 1

INVENTOR
HANS GRONAU
By Haire and Nydick
ATTORNEYS

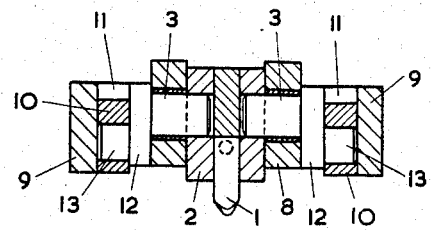
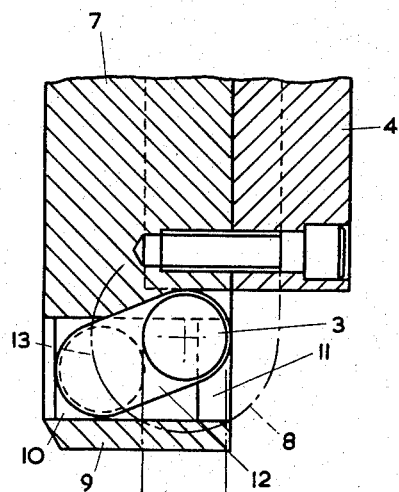
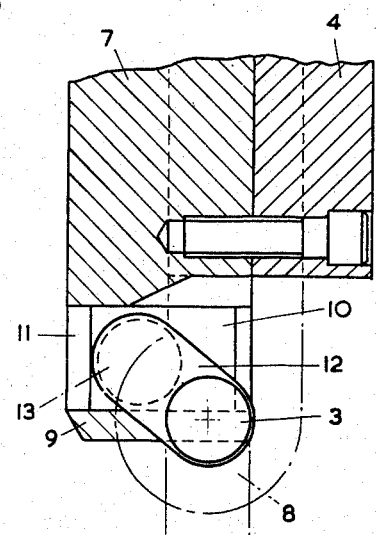
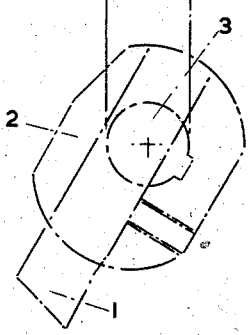
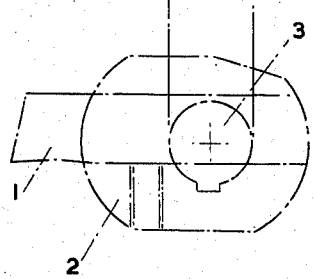

United States Patent Office 2,905,063
Patented Sept. 22, 1959

2,905,063

SLOTTING MECHANISM

Hans Gronau, London, England, assignor to Victoria Machine Tool Company Limited, London, England, a British company Application July 2, 1957, Serial No. 669,529

15 Claims. (Cl. 90—43)

This invention relates to slotting mechanism and has for its object the provision of an improved mechanism for the slotting of punches. The proper shaping of punches usually requires the tool to follow at each cutting stroke a straight line path for a sufficient distance and then to swing away from the work so as to leave a strengthening fillet radius between the part of the punch which is shaped to section and the larger size of the stock material from which it is made, and it is the object of the present invention to provide an improved mechanism which gives this function. The mechanism may take the form of an attachment which can be attached to a milling machine and driven from the spindle thereof.

The invention consists broadly of a slotting mechanism comprising a driving member which is reciprocable, a rotatable tool holder, and means whereby said driving member, when moved in a given direction, with said tool holder at a given rotary position, first carries said tool holder with it so that the tool makes a cut, and then causes said tool holder to rotate with its axis of rotation stationary so as to swing the tool forwards and away from the workpiece for making an arcuate cut.

In order that the invention may be the more clearly understood a machine in accordance therewith will now be described, reference being made to the accompanying drawings wherein:

Figure 5 is a sectional plan on line V—V of Figure 1.

Figure 6 is a sectional side elevation to a larger scale on line VI—VI of Figure 4.

Figure 7 is a view illustrating the position of the tool in Figure 6.

Figure 8 is a similar view to Figure 6 but with the tool holder and tool at the bottom of the stroke.

Figure 9 is a view illustrating the position of the tool in Figure 8.

Figure 1:
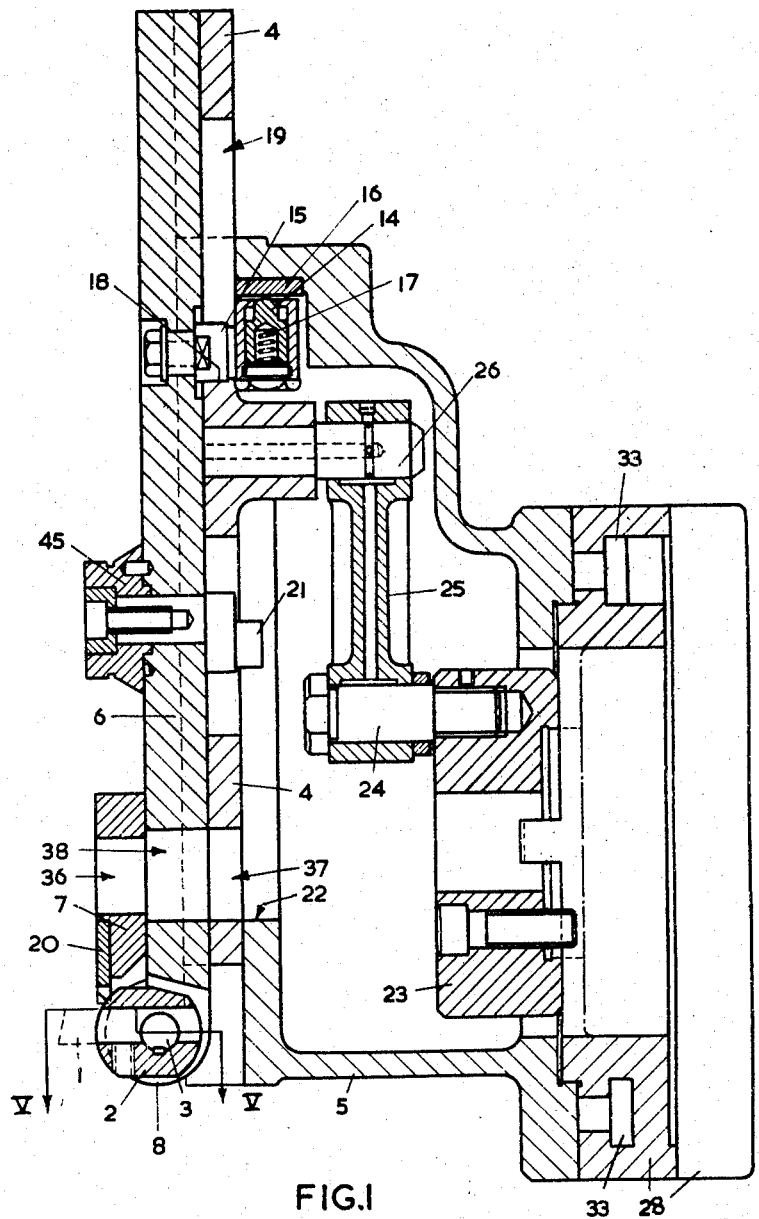
Figure 1 is a sectional side elevation of the mechanism with the tool holder and tool at the top of the stroke and the tool horizontal ready to make a down cutting stroke.
Figure 2:
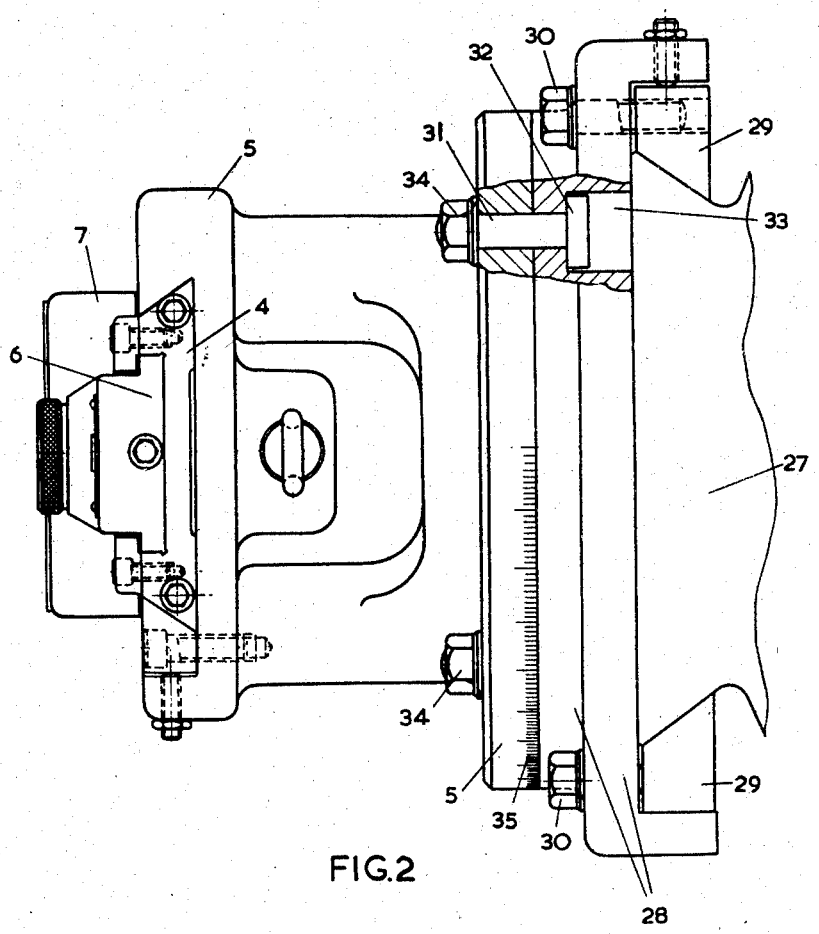
Figure 2 is a plan of the same.
Figure 3:
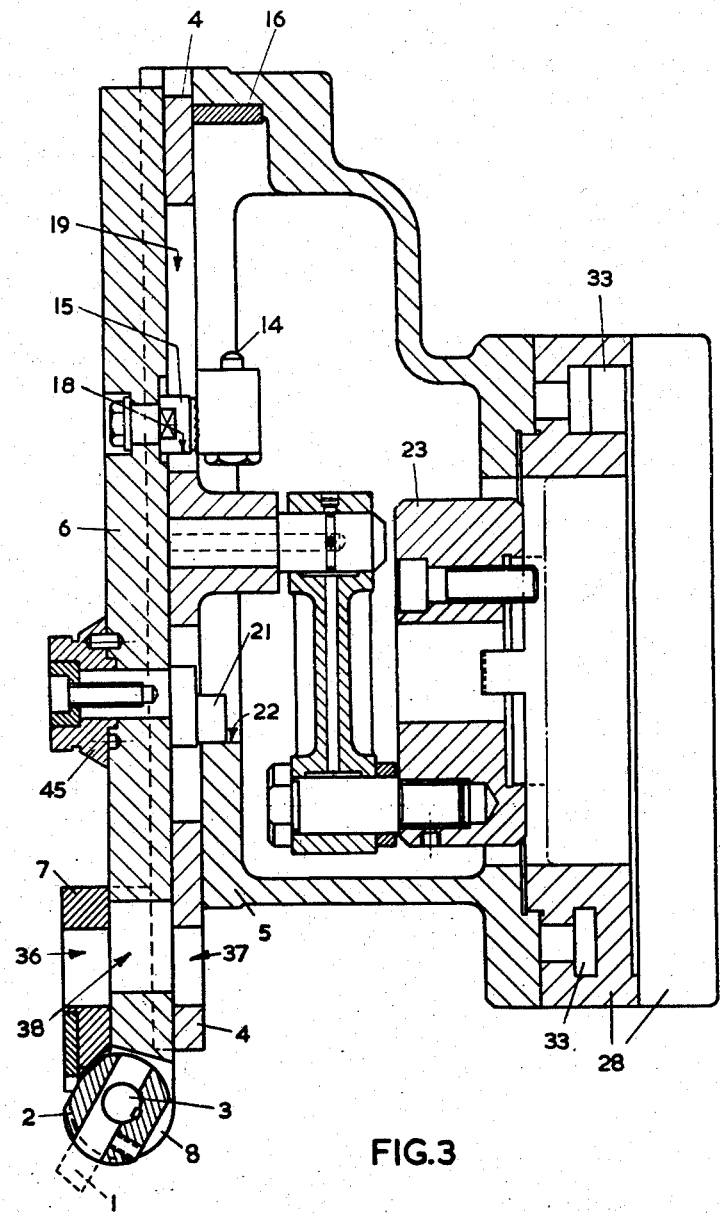
Figure 3 is a similar view to Figure 1 with the tool holder and tool at the bottom of the stroke and the tool inclined subsequently to having swung away from the work.

Referring to Figures 1 to 9, the tool 1 is mounted fast in a tool holder 2 with its cutting end projecting from said tool holder. The tool holder 2 is oscillatable about the axis of two horizontal trunnion members 3 at right angles to the geometrical axis of the tool 1 and is also reciprocatable vertically up and down, and the arrangement is such that, as said tool holder makes its up stroke, its angular position about its axis of oscillation is such that the cutting end of the tool is inclined downwards out of contact with the workpiece, as shown in Figures 3 and 7, and as said tool holder makes its down stroke, its angular position about its axis of oscillation is first such that the said tool is horizontal as shown in Figures 1 and 9, and therefore cuts vertically in the workpiece, and afterwards, as said tool holder moves to the down end of its stroke, it rotates about its said axis of oscillation back to the position at which the cutting end of the tool is inclined downwards thereby progressively swinging said cutting tool away from said workpiece. Thus, if the workpiece is a punch, a strengthening fillet radius will be left between the part of the punch which is shaped to section and the larger size of the stock material of which the punch is made.

In order that the tool holder shall function as described, two vertical slides are provided, one of which—hereinafter called the outer slide 4—slides vertically relatively to a fixed part 5, and the other of which—hereinafter called the inner slide 6—slides vertically in a slot formed in the outer slide 4. The outer slide 4 has mounted on its front face at its bottom end and extending downwards beyond its lower end, a bridge piece 7 which bridges the inner slide 6. The inner slide 6 at its bottom end is formed with two downwardly projecting lugs 8 spaced apart and having bearing holes in them which receive the trunnion members 3 with the tool holder 2 between said lugs 8, and said bridge piece 7, at its bottom end, is formed with lugs 9 outside the respective lugs 8, which lugs 9 carry respective bearing blocks 10. Said bearing blocks 10 are constrained against vertical movement relative to said lugs 9, but are capable of sliding horizontally relative to said lugs 9 in slots 11 in a direction at right angles to said trunnion members 3. Said bearing blocks 10 have bearing holes in them whose common axis is parallel to that of the trunnion members 3.

Each of the trunnion members 3 has a crank arm 12 extending at right angles from it in the space between the adjacent lugs 8 and 9 and said crank arm has a crank pin 13 extending from its end remote from said trunnion member 3 into the said bearing hole in the adjacent bearing block 10. The tool holder 2 is keyed fast with each trunnion member 3.

Figure 4:
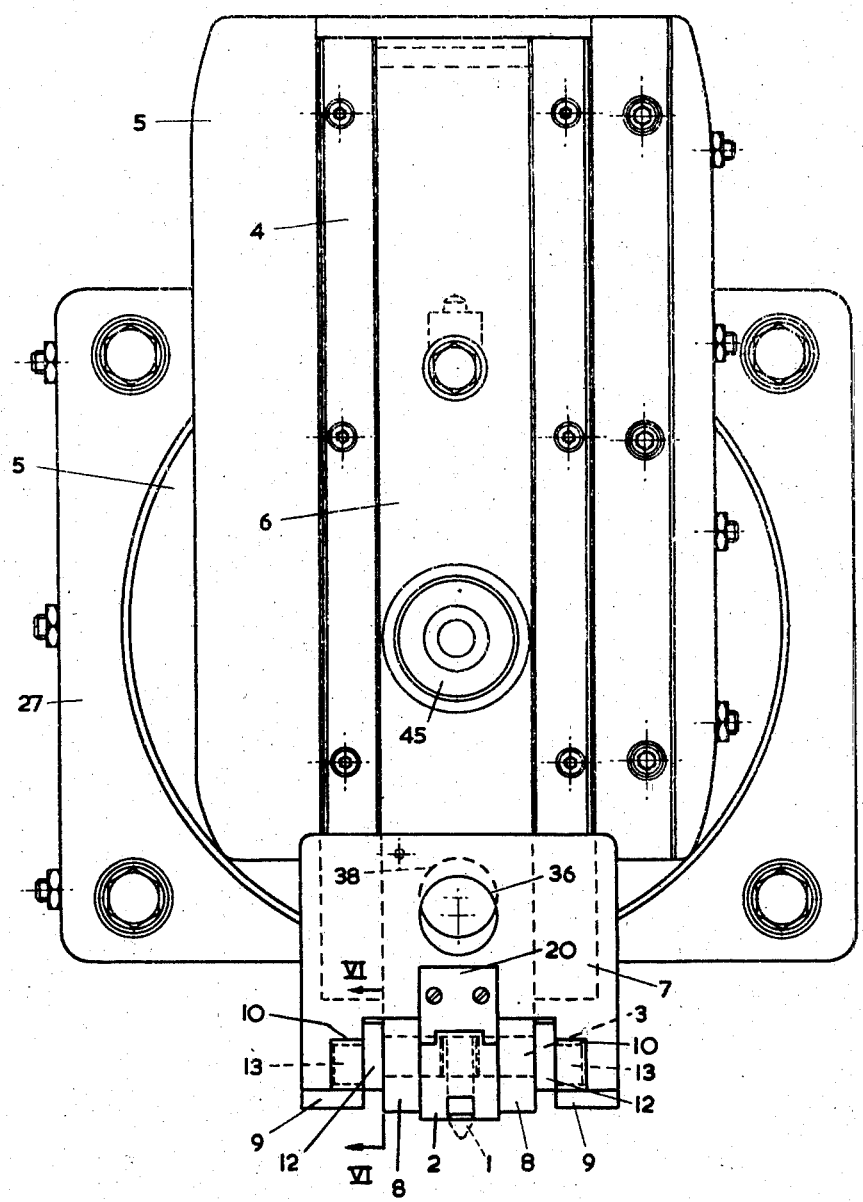
Figure 4 is a front elevation of the same.

It will now be seen that vertical movement of the inner slide 6 will effect vertical movement of the tool holder 2, and that relative vertical movement between the inner slide 6 and the outer slide 4 will cause relative vertical movement between the bearing blocks 10 on the one hand and the lugs 8 on the other, and thus will cause rotation of the trunnion members 3 which are fast with the tool holder 2, and therefore will cause rotation of said tool holder. Thus the afore-described vertical reciprocation and rocking oscillation of said tool holder 2 is effected. The timing takes place as follows:

Assuming that both slides 4 and 6 are at the bottom of their stroke, as in Figures 3 and 4, the tool holder 2 will be at the bottom of its stroke at an angular position such that the cutting end of the tool 1 is inclined downwards as stated. As the outer slide 4 is moved upwards, the inner slide 6 will move upwards with it owing to friction, and the tool holder 2 and tool 1 will accordingly move upwards without any change of orientation, and the tool will pass the face of the workpiece without touching it.

Shortly before the outer slide 4 reaches the top of its stroke a spring loaded plunger 14 carried by an arm 15 which is fast with the inner slide 6 engages a fixed surface and this, without further compression of the plunger spring 17 (which is preloaded) is sufficient to stop said inner slide 6. The outer slide 4 continues to move upwards until, just before it reaches the top of its stroke, a surface 18 of said outer slide engages said arm 15 and again causes the inner slide 6 to move upwards with said outer slide until the latter has reached the top of its stroke. This compresses the spring 17 of the plunger 14 and ensures that the said surface 18 and arm 15 will be hard in engagement until after the down stroke has begun.

It will be seen that the arm 15 projects through a slot 19 in the outer slide 4 and the surface 18 is constituted by the lower end of said slot.

The relative vertical movement which has thus taken place between the outer and inner slides 4 and 6 has rocked the tool holder 2 so that the tool 1 now occupies the horizontal position as shown in Figure 1, and further rotation of said tool holder in the same direction is prevented by the engagement of the top of said tool holder with the lower end of a thrust block 20 mounted fast on the front surface of the bridge piece 7. When therefore the outer slide 4 makes its down stroke the tool 1 engages and cuts the workpiece and the tool holder 2 is held hard up against the said thrust block and the relative position of the two slides remains unchanged.

When the outer slide 4 nears the bottom of its stroke a second projection 21 fast on the inner slide 6 engages a fixed surface 22 thereby stopping said inner slide. The outer slide continues to move down for a short space and thereby, by the action of the cranks 12, said tool holder 2 is again rocked to the position at which the cutting end of the tool 1 is inclined downwards. Thus the cycle is completed.

Describing now certain details of construction and arrangement, the parts heretofore described are all incorporated in an assembly which comprises a main fixed casing 5 which forms the base on which the outer slide is slidably mounted. Within this casing is a rotatable driving disc 23 which has a crank pin 24 mounted thereon and connected, by means of a connecting rod 25 to a pin 26 on said outer slide 4, so that rotation of said driving disc effects the reciprocation of said outer slide. The assembly is adapted to be mounted on the face of the vertical column 27 (Figure 2) of a horizontal milling machine so that a driving tang previously inserted into the cone bore of the spindle nose of the milling machine may be coupled to said driving disc 23.

To this end said casing 5 is secured to a coupling member 28 which is provided with clamping jaws 29 having inclined surfaces to clamp with the inclined side surfaces of said vertical column 26 when tightened by means of screws 30 as will be clear from Figure 2. The securement of said casing 5 to said coupling member 28 is effected in such a way that said casing 5 is rotatably adjustable relative to said coupling member so that the path of movement of the tool can be tilted to any desired direction. Thus said casing 5 is secured to said coupling member 28 by means of bolts 31 with heads 32 which bolts and heads engage in a circular T slot 33 in said coupling member 28. By loosening nuts 34 on said bolts 31 the casing 5 can be rotated relative to said coupling member 27. Calibration marks 35 indicate the angle of tilt.

Figure 10:
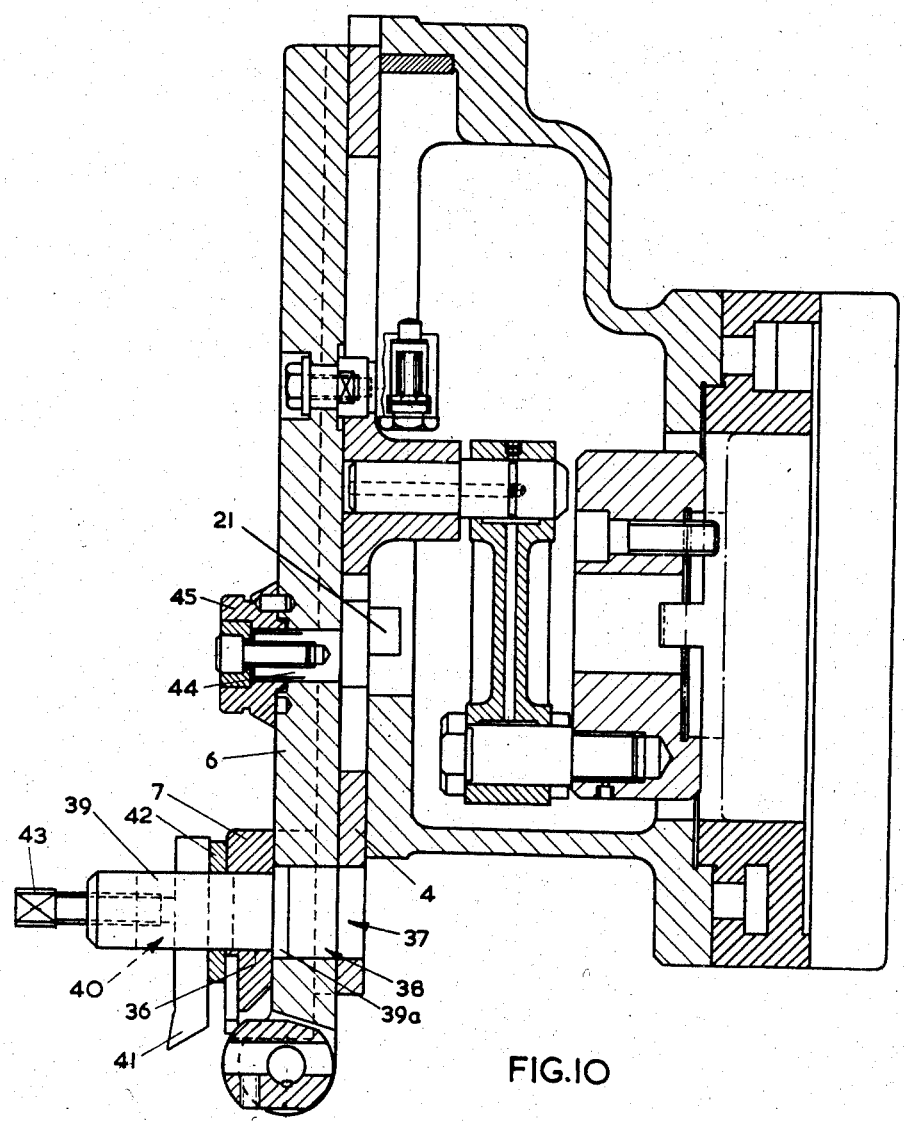
Figure 10 is a sectional side elevation of the mechanism with an alternative tool fitted for straight cutting.

Although the mechanism is to be used for punch slotting it is also capable of being used for ordinary slotting. Thus the bridge piece 7 and the outer slide 4 are formed with aligned through holes 36 and 37, and the inner slide is also formed with a hole 38 which, when the slides are correlated as in Figure 1, is coaxial with said holes 36 and 37. When the mechanism is to be used for ordinary slotting said holes 36, 38, 37 are brought to coaxial correlation and, as shown in Figure 10, a cylindrical tool holder 39, with a head 39a is passed through said holes from the back so as to lock the inner slide 6 to the bridge piece 7 (i.e. to the outer slide). This tool holder has a vertical slot 40 in it and the tool 41 is passed down through said slot and clamped against the bridge piece 7, with a washer 42 in between, by means of a screw 43. The projection 21 is adjustable by being mounted eccentrically with respect to a rotatable spindle 44 which passes through the inner slide 6 and has an adjusting knob 45 thereon. When the tool 41 is to be used said projection 21 is adjusted to the level shown in Figure 10 and the inner and outer slides can then be reciprocated together throughout the full stroke of said outer slide.

I claim:

1. A slotting mechanism comprising, in combination, a main support means, a driving member supported upon said main support means for recpirocating movement, a second member supported upon said main support means for reciprocating movement relative to said driving member, a tool holder rotatably mounted upon said second member, means responsive to a movement of said driving member into a cutting direction relative to a work piece, to move said second member together with said driving member and to support said tool holder in a cutting position against retrograde rotation out of said cutting position, stop means arresting movement of said second member beyond a predetermined point during movement of said second member into said cutting direction, independently of and during continued movement of said driving member in said cutting direction, and transmission means acting between said driving member and said tool holder, responsive to said continued movement of said driving member to rotate said tool holder in a direction forwardly and away from the work piece to make an arcuate cut.

2. A mechanism according to claim 1, wherein said driving member carries said second member with it in said cutting direction by friction.

3. A mechanism according to claim 1, wherein said driving member holds said tool holder and tool against retrograde rotation by a surface of said driving member abutting against the back of said tool holder or tool.

4. A mechanism according to claim 1, wherein said transmission means comprise crank pins fast with said tool holder, one each side thereof at a given radius with respect to the axis of rotation thereof and bearing blocks having holes in which said crank pins engage said bearing blocks being carried by said driving member so as to be capable of moving relative thereto in a direction at right angles to the direction of movement of said driving member.

5. A mechanism according to claim 4, wherein said tool holder includes trunnions fast therewith rotatably supported within bearing holes in lugs of said second member; said crank pins are carried by crank arms fast on said trunnions on the outside of said lugs, and said bearing blocks are carried by lugs of said driving member on the outside of said crank arms.

6. A mechanism according to claim 1, wherein said driving member, when moved in an opposite return direction carries said second member with it without relative movement between said members with said tool in a forward-swung position out of engagement with the workpiece, and means arresting the return movement of said second member before said driving member reaches the return end of its stroke, whereby the relative movement between said members acting through said transmission means returns said tool holder to the cutting position, ready for the next movement in the cutting direction.

7. A mechanism according to claim 6, wherein said driving member carries said second member with it in the return direction by friction.

8. A mechanism according to claim 6, wherein the arrest of said second member is effected by said second member engaging a stop.

9. A mechanism according to claim 8, wherein the engagement of said second member with said stop is yieldable immediately prior to said driving member reaching the return end of its stroke, said driving member positively engaging said second member to carry the same with it, whereby said yieldable engagement ensures that the driving and second members are accurately positioned relatively so as to hold the tool holder at the correct cutting position.

10. A mechanism according to claim 1, further comprising a rotatable member associated with said driving member, said driving member being reciprocated in response to the rotation of said rotatable member.

11. A mechanism according to claim 10, wherein said rotatable member is connected to said driving member through a crank pin and connecting rod.

12. A mechanism according to claim 10, wherein the mechanism is incorporated in a unit assembly adapted to be mounted on the face of the vertical column of a milling machine, with the spindle of said milling machine coupled to said rotatable member.

13. A mechanism according to claim 12, and in which said unit assembly comprises a main base structure which carries all the moving parts, wherein said main base structure is secured to a coupling member having means whereby it may be clamped to said vertical column.

14. A mechanism according to claim 13, wherein said main base structure is capable of being rotatably adjusted relative to said coupling member about the axis of rotation of said rotatable member whereby the direction of movement of the cutting tool can be adjusted.

15. A mechanism according to claim 1, wherein said second member is adjustable relative to said stop.

References Cited in the file of this patent
UNITED STATES PATENTS 2,727,438    Gack _____ Dec. 20, 1955